US005975909A

United States Patent [19]

Ritchie

[11] Patent Number: 5,975,909

[45] Date of Patent: Nov. 2, 1999

[54] UTENSIL MANIPULATION TRAINING TOOLS AND METHOD

[76] Inventor: Samuel E. Ritchie, 1502 Stonewall Dr., Alexandria, Va. 22302

[21] Appl. No.: 09/156,043

[22] Filed: Sep. 17, 1998

[51] Int. Cl.$^{6}$ ...................................................... A47J 43/28

[52] U.S. Cl. ............................... 434/127; 30/322; 30/324

[58] Field of Search ............................. 30/146, 147, 148, 30/149, 150, 322, 324, 327, 323, 340; 434/127; 83/13

[56] References Cited

U.S. PATENT DOCUMENTS

| | | | |
|---|---|---|---|
| 375,773 | 1/1888 | Rockwell | 30/340 |
| 983,736 | 2/1911 | Maconochie | 30/322 X |
| 1,625,003 | 4/1927 | Walker . | |
| 2,124,615 | 7/1938 | Foltz | 30/340 |
| 2,576,388 | 11/1951 | Claflin | 30/327 |
| 2,762,120 | 9/1956 | Mack | 30/340 X |
| 2,889,624 | 6/1959 | McDonald . | |
| 3,224,093 | 12/1965 | Huck | 30/324 |
| 3,271,856 | 9/1966 | Rowley . | |
| 3,742,602 | 7/1973 | Brumwell | 30/340 |
| 3,967,376 | 7/1976 | Foley | 30/149 X |
| 4,389,777 | 6/1983 | Landsberger | 30/340 X |
| 4,779,344 | 10/1988 | Panisch . | |
| 4,984,367 | 1/1991 | Albanese | 30/147 |
| 5,251,380 | 10/1993 | Craig | 30/340 X |
| 5,689,890 | 11/1997 | Glesser | 30/340 |

*Primary Examiner*—Rinaldi I. Rada
*Assistant Examiner*—Ana Luna
*Attorney, Agent, or Firm*—Cahn & Samuels, LLP

[57] ABSTRACT

A utensil kit with a knife, spoon and two forks and method particularly for training adolescents to hold eating utensils correctly and in the a proper eating position where each of the utensils includes a contoured gripping portion formed over the utensil handle adapted to receive and register fingers and the thumb in color coded grooves corresponding to the proper position for the respective eating utensil and to enhance hand comfort when the utensil is being held and manipulated according to proper etiquette.

12 Claims, 3 Drawing Sheets

UTENSIL MANIPULATION TRAINING TOOLS AND METHOD

TECHNICAL FIELD

The present invention is directed to improvements in training persons to hold eating utensils in a proper manner by employing teaching utensils with indicator coded and finger molded handles. The invention contemplates the use of utensils with molded contours encouraging proper finger placement and indicators of both markings and color to identify hand selection and placement of particular fingers for each hand. The inventive method and tools herein define a superior means for parents to teach young children proper eating utensil utilization and technique with a minimum of adjuncts and teaching complexity.

BACKGROUND OF THE INVENTION

As use of a standard set of eating utensils namely, knives, forks, and spoons, has evolved over the past century, many different structures, systems, and methods have emerged for teaching children etiquette and, more particularly, proper conventional utilization of such eating utensils. It is also well known that customs of different cultures create diverse utensil handling habits differently. For example, unlike the United States, in Europe the knife and fork do not change hands. Due to its cultural diversity, the United States has given rise to its own customs and nuances of proper utensil use.

Regardless of the culture, it is indisputable that adherence to proper table manners is of great social significance, particularly for adults in formal surroundings. Although typically of a more forgivable nature, the proper practice of utensil etiquette by children is also considered important when in public. Therefore, due to the importance ascribed to proper utensil etiquette, different methods and devices have been developed to encourage utensil manipulation.

Many eating utensil and handle adjuncts developed for use by infants and toddlers, particularly during initial utensil handling training, are helpful in respect to utensil stabilization but not particularly useful for mastering proper utensil use. Likewise, special utensils developed for use by persons with eating or manipulative disabilities, while very useful for their intended function, are not particularly helpful in teaching proper utensil etiquette. In the patent literature many such devices are disclosed. For example, U.S. Pat. No. 3,224,093 discloses a training utensil directed to teaching toddlers and infants how to hold on to utensils. In connection with eating adjuncts for persons with disabilities, U.S. Pat. No. 5,075,975 disclose an improved eating utensil for manually impaired individuals that incorporates a handle and finger grip/guide. Adjuncts have even been developed to assist in dietary control during eating. U.S. Pat. No. 4,914,819 discloses eating utensils that incorporate a timing element to provide a signal to the user corresponding to the appropriate interval between bites.

Notwithstanding the usefulness of the above-described utensil modifications and methods, a need still exists for a simple utensil handling teaching method that corresponds to American eating customs and etiquette.

SUMMARY OF THE INVENTION

It is therefore an object of the present invention to provide a utensil structure and method that overcome the above noted shortcomings and other problems of the prior art.

It is another object of the invention to provide an improved utensil structure and instruction method capable of quickly and effectively teaching adolescents and persons new to American culture, proper eating utensil use.

It is another object of the invention to provide an improved, simple, utensil structure and method capable of encouraging standardized finger positioning on an eating utensil.

Still another object of this invention is to provide an eating utensil handling instruction system that is capable of self-instruction.

Yet other objects of this invention are satisfied by a utensil structure of sufficient strength and durability and structural integrity so as to permit home and or institutional use.

A further object of this invention is to provide a utensil structure that allows for repeated, effective dishwasher cleaning and minimizes breakage.

Still another object of the invention is to provide a utensil and utensil handle structure that may be conveniently, efficiently, and inexpensively manufactured.

These and other objects are satisfied by a utensil for training persons to hold eating utensils in the proper eating position for the thumb, the index finger and the middle finger of a hand, comprising, a food contacting portion, a generally elongated handle affixed to said handle, said handle defining an elongated shaft section supporting a contoured gripping section said gripping section incorporating a plurality of contoured lands and at least three grooves separated by said lands where at least two of the at least three grooves is at an oblique angle relative to the elongation of said shaft section, one of the at least three of said grooves corresponding in depth and shape to accommodate proper positioning of the thumb, a second of the at least three grooves corresponding in depth and shape to accommodate proper positioning of the index finger and a third of the at least three grooves corresponding in depth and shape to register the middle finger in the proper position.

Further objects of the present invention are satisfied by a method of teaching proper finger and hand position for an eating utensil, comprising the steps of providing a utensil according to the foregoing and instructing the placement of fingers corresponding to the grooves on said gripping section.

In essence, the invention herein provides a method and structure promoting proper hand selection and finger placement for each one of a selected set of utensils. With the clearly identifiable guidance provided by the invention, daily use by adolescents and or newcomers to American eating utensil manipulation protocol is encouraged by utensil conformation that virtually mandates specific finger placement reinforced by avoidance of discomfort. The utensils according to the invention provide an uncomplicated coded finger placement and grip arrangement that at once, guide finger position on the particular utensil during a particular function and discourages improper placement due to an increased level of user discomfort. In that manner, the invention teaches proper utensil manipulation by "memorization"; routine, repetitive, and continuous proper hand motion and finger placement.

The invention also fulfills existing needs for rugged teaching utensils capable of repeated dishwasher cleanings, providing minimum of maintenance and breakage problems, and reducing the development of undesired jagged edges on the utensil handles. Thus, utensils according to the invention are relatively easy and cost effective to manufacture, substantially conform to conventional utensil configuration, strong, washable and useable even in institutional environments.

As used herein, "substantially" means a characteristic representative of a particular quality but not the quality per se. In other words the term is intended to modify the adjective to mean that the characteristic exhibit more of the particular characteristic than its opposite.

Given the following enabling description of the drawings, the inventive assembly should become evident to a person of ordinary skill in the art.

DETAILED DESCRIPTION OF THE PREFERRED EMBODIMENT

FIGS. 1–8 represent of a complete utensil set (one each of a right hand fork 10, a spoon 12, a knife 14, and a left-hand fork 16 for cutting) according to a first embodiment of the invention. All of the illustrated utensils are constructed for use by right-handed persons.

Figure 1:
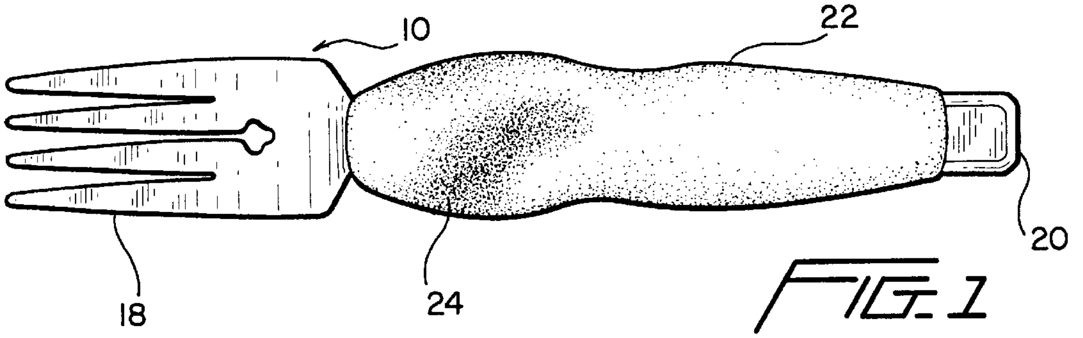
FIG. 1 is a bottom view of a fork for use in the right hand by a right-handed person according to a first embodiment of the invention.
Figure 2:
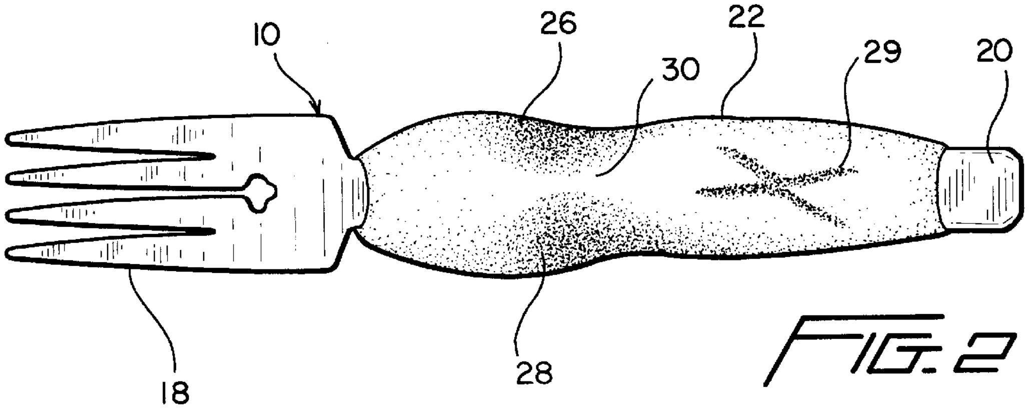
FIG. 2 is a top view of the fork according to FIG. 1.

FIGS. 1 and 2 illustrate a fork including the food contacting tines 18 and axially and rearwardly projecting handle 20. A gripping portion 22 is formed about the handle and defines a contoured surface. The primary features of the surface include a plurality of finger nesting grooves 24,26, and 28 separated by finger separation ridges and such as ridge 30 separating grooves 26 and 28. Each of the grooves is sized and adapted to comfortably receive and positionally stabilize fingers of the right hand. In the illustration, groove 24 is disposed at an oblique angle relative to the axis of elongation of the handle shaft 20 and is contoured to receive the middle finger. The groove 26 is adapted to receive and hold the index finger in a position above and substantially parallel to the middle finger. The groove 28 is sized and configured to conform and retain the thumb in an opposed position to both the underlying middle finger and the index finger.

In the illustrated embodiment, the handle 20 and the food contacting tines 18 are formed of one piece of metal, thereby corresponding to conventional stainless steel or plated silverware. A gripping portion 22 is located on and supported by the handle 20 extending over most of its length. Preferably, the gripping portion 22 and food contact portions are of monolithic construction being composed of a strong, and durable material such as polymeric resins, metal, or ceramics which is molded/cast into a single, unitary structure. However, any combination of the forgoing which meets strength and durability objectives can be used. In fact the material comprising the gripper may be entirely rigid or may constructed of a rubbery material, possessing some pliability and resiliency and, therefore, a partially yielding surface that is intended to increase user comfort. Such gripper elements also can be formed as sleeves for combination with ordinary household utensils although for institutional and commercial use, the monolithic structure is preferred.

Advantageously, the finger grooves are coded (color, Braille, etc. to facilitate sensory placement (sight or touch). An exemplary color-coding scheme for visual coordination includes:

| | | |
|---|---|---|
| Red | Groove 24 | middle/second finger |
| Blue | Groove 26 | index/first finger |
| Green | Groove 28 | thumb |

The coloration may be added by paint, molded directly into the gripper. Although decals and other marking elements can be employed, ruggedness and permanency is functionally preferred and color brightness is aesthetically preferred. Thus, dishwasher proof colorants on dishwasher safe materials should be used.

In the case of the fork particularly, it is advantageous to include a marking designating with which hand the fork is intended for use. As illustrated, the marking 29 "X" is employed to designate the right hand. However, any number of other markings, e.g. "R", can be used.

The illustrated embodiment of the fork 10 is particularly suited for teaching utensil manipulation by children between the ages of five to nine years old. For use by persons, younger or older, it is recommended that the size of the grip and grip features be adjusted to accommodate the respective smaller or larger sized hands. Variations also may be readily developed without undue experimentation to create training utensils for persons who are not able to utilize the illustrated right-hand oriented utensils.

Figure 3:
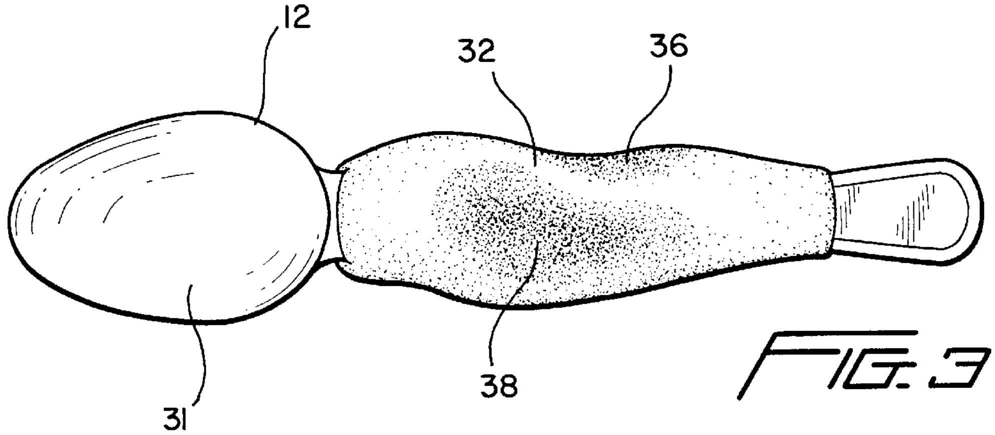
FIG. 3 is a top view of a spoon for use in the right hand by a right-handed person according to a first embodiment of the invention.
Figure 4:
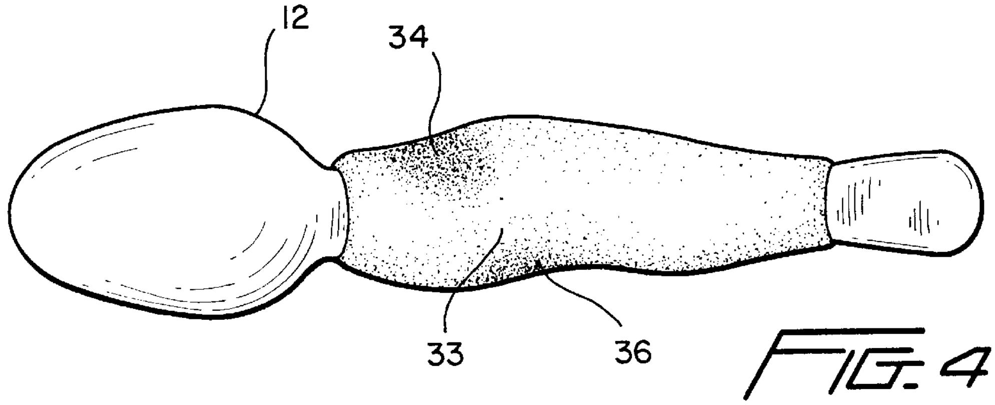
FIG. 4 is a bottom view of the spoon according to FIG. 3.

Turning to FIGS. 3 and 4, the illustrated spoon 12 possesses a food contacting concave scoop 31 at one end and a rearwardly projecting shaft with a gripper member featuring nesting grooves 34, 36, and 38 which correspond respectively to the grooves 24, 26, and 28 of the fork 10. The groove 34 for the middle finger underlies the handle and opposes the thumb groove 38 on the gripper's top surface which in turn is contiguous to the index finger groove 36. The nesting grooves 38 and 36 are separated by the top ridge 32 and the grooves 36 and 34 separated by the bottom ridge 33.

Figure 6:
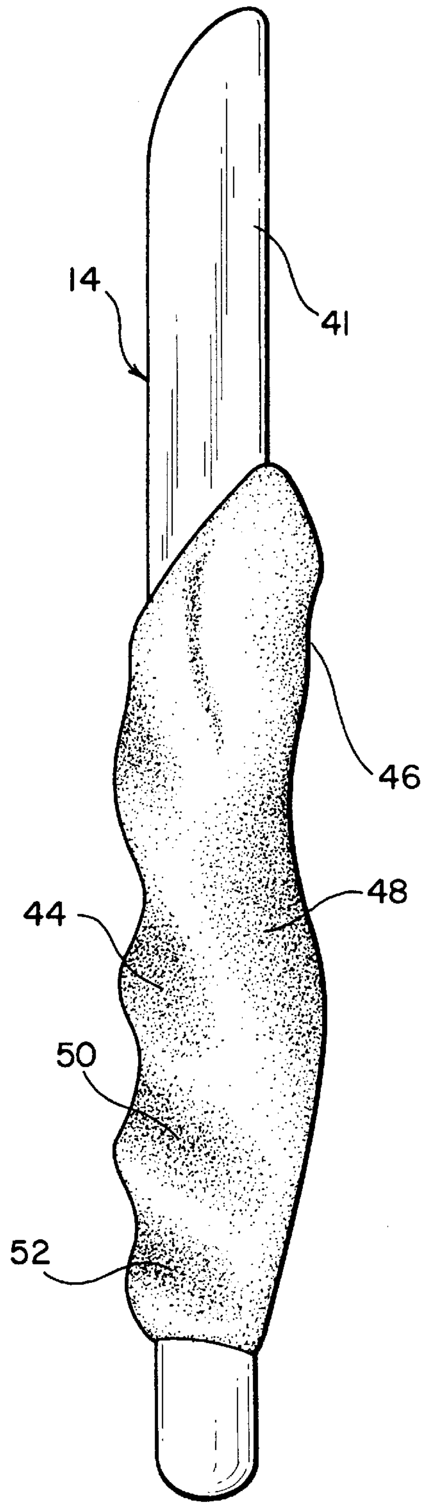
FIG. 6 is an opposite side view of the knife according to FIG. 5.
Figure 5:
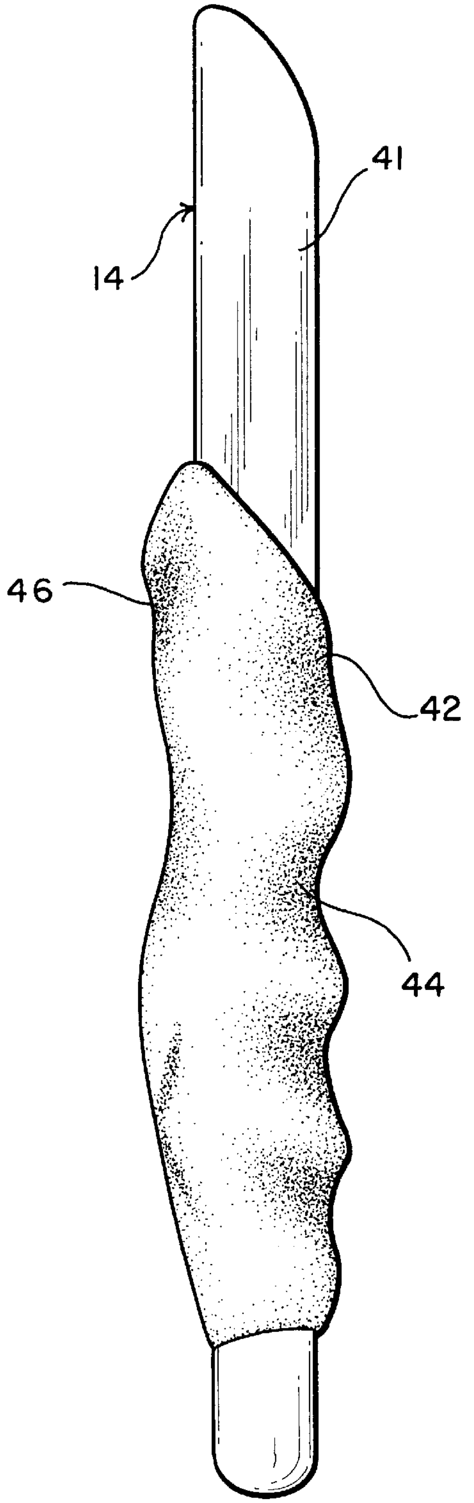
FIG. 5 is a side view of a knife for use in the right hand by a right-handed person according to a first embodiment of the invention.

FIGS. 5 and 6 represent a knife 14 constructed in accordance with the illustrated embodiment. The knife 14 has a forwardly projecting cutting blade 41 and a rearwardly directed handle with gripper member 42. The gripper 42 includes nesting grooves or valleys for all of the digits on a hand. The bottom forward valley 44 is to hook the middle finger around the handle. The upper indentation/valley 46 receives and holds the index finger in the proper position and the thumb groove 48 is positioned on the gripper side to oppose the middle finger. Unlike the above-described fork and spoon, the knife also requires positioning of the fourth and fifth (little/pinky) fingers. To provide for those digits, the gripper 42 includes valleys 50 and 52 substantially paralleling middle finger groove 44. As in the case of the other grooves, these too are color-coded. For example, the groove 50 is colored purple to correspond to the forth finger while the groove 52 corresponding to the pinky/fifth finger, is colored orange. A young knife user is assisted by the gripper structure to stabilize the knife blade during the saw-type cutting action of the knife 14 in the right hand for cutting food.

Figure 7:
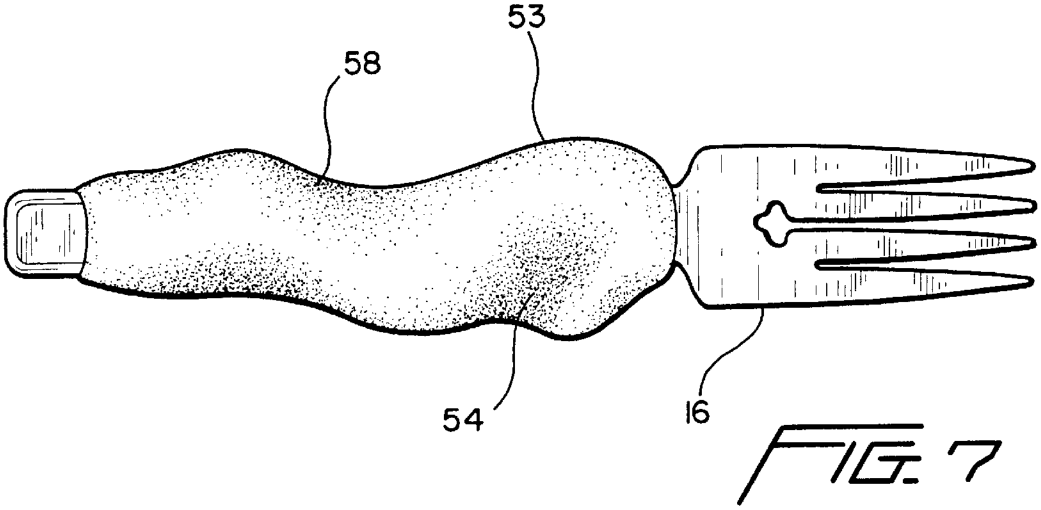
FIG. 7 is a top view of a fork for use in the left hand by a right-handed person during knife cutting according to a first embodiment of the invention.
Figure 8:
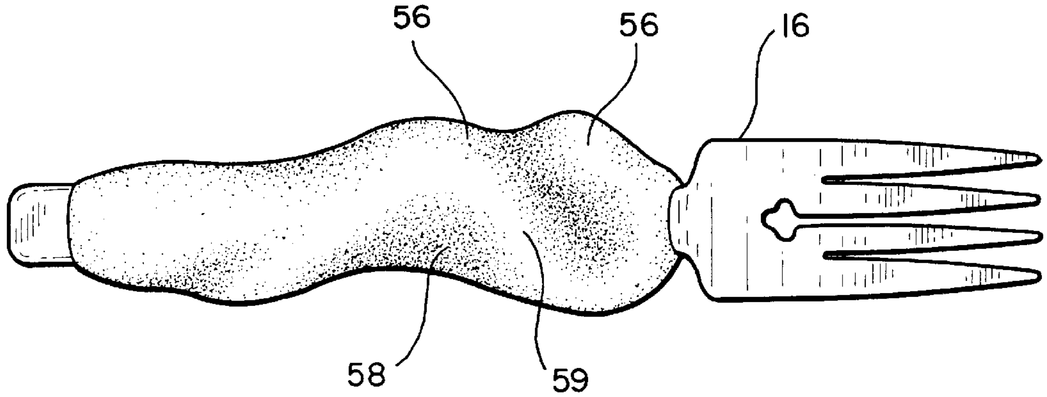
FIG. 8 is a bottom view of the fork according to FIG. 7.

Finally, in FIGS. 7 and 8 a fork including a gripper 53 configured to be held in the left hand when food is being cut with the knife 14 being held in the right hand. Here the nesting groove 54 runs almost transverse of the axis of fork handle as the groove 56 curls across the top of the thumb groove 58 with a depressed ridge 59 separating the grooves.

Use of the above-described invention encourages proper utensil handling because of the increased hand comfort resulting from proper finger placement. Furthermore, by mere repetition, the invention can assist even the most recalcitrant students to learn proper utensil handling. In the case of younger learners, use of the invention can be turned into a game or contest by combining dexterity matching of correct fingers with the color coordinated utensils portions.

The above-described embodiments have been directed to right handed and American eating etiquette. However, the invention contemplates adaptability for other cultures and for use by persons with disabilities.

Given the foregoing, variations and modifications to the invention should now be apparent to a person having ordinary skill in the art. These variations and modifications are intended to fall within the scope and spirit of the invention as defined by the following claims.

I claim:

1. The method of teaching proper finger and hand position for a set of eating utensils, comprising the steps of:

providing a spoon with a concave food contacting portion and an elongated handle defining generally oppositely facing first and second surfaces and an axis of elongation, said handle including a shaft section affixedly connected to said concave food contacting portion, a gripping element being formed on said shaft, said gripping element defining a contoured surface with a first, coded thumb receiving valley disposed on said first surface, a second, coded index finger receiving valley disposed on said first surface, and a third, coded middle finger receiving valley disposed on said second surface, said first, second, and third valleys being separated by a plurality of ridges, said first valley being disposed substantially along said axis of elongation and being sized to accommodate the thumb in a proper position, at least one of said second and third valleys being disposed at an oblique angle to said axis of elongation and being size to comfortably receive and positionally stabilize a finger in the proper eating position;

providing a first fork with a tined food contacting portion and an elongated handle defining generally oppositely facing first and second surfaces and an axis of elongation, said handle including a shaft section affixedly connected to said tined food contacting portion, a gripping element being formed on said shaft, said gripping element defining a contoured surface with a first, coded thumb receiving valley disposed on said first surface, a second, coded index finger receiving valley disposed on said first surface, and a third, coded middle finger receiving valley disposed on said second surface, said first, second, and third valleys being separated by a plurality of ridges, said first valley being disposed substantially along said axis of elongation and being sized to accommodate the thumb in a proper position, at least one of said second and third valleys being disposed at an oblique angle to said axis of elongation and being size to comfortably receive and positionally stabilize a finger in the proper eating position;

providing a second fork with a tined food contacting portion and an elongated handle defining generally oppositely facing first and second surfaces and an axis of elongation, said handle including a shaft section affixedly connected to said tined food contacting portion, a gripping element being formed on said shaft, said gripping element defining a contoured surface with a first, coded middle finger receiving valley disposed on said first surface, a second, coded thumb receiving valley disposed on said first surface, and a third, coded middle finger receiving valley disposed on said second, said first, second, and third valleys being separated by a plurality of ridges, said first valley being disposed substantially along said axis of elongation and being sized to accommodate the index finger in a proper position for holding food while being cut, at least one of said second and third valleys being disposed at an angle substantially perpendicular to said axis of elongation and being size to comfortably receive and positionally stabilize a finger in the proper eating position;

providing a knife with a cutting blade food contacting portion and an elongated handle defining an axis of elongation, said handle including a shaft section affixedly connected to said cutting blade food contacting portion, a gripping element being formed on said shaft, said gripping element defining a contoured surface with a first, coded middle finger receiving valley, a second, coded thumb receiving valley, and third, fourth and fifth finger receiving valleys, said first, second, and third valleys being separated by a plurality of ridges, said first valley being disposed substantially parallel to said axis of elongation and being sized to accommodate the index finger in a proper position for cutting food with the blade, at least one of said second, third, fourth or fifth valleys being disposed at an angle substantially perpendicular to said axis of elongation and being size to comfortably receive and positionally stabilize a finger in the proper eating position;

placing a user's middle finger in the middle finger receiving valley of a select one of said spoon, first fork, second fork, and knife;

placing a user's thumb in the thumb receiving valley of said select one of said spoon, first fork, second fork, and knife; and placing a user's index finger corresponding to the index finger receiving valley of said select one of said spoon, first fork, second fork and knife;

where the user is trained to hold said set of utensils in a manner corresponding to proper utensil etiquette.

2. The method of claim 1 further comprising the steps of forming the utensil set from molded polymeric resin and using color for coding the valleys and to identify finger placement.

3. A method for training a user to hold eating utensils with the thumb, the index finger and the middle finger of a hand in a polite eating position for, comprising the steps of:

providing a set of utensils consisting of the group selected from a knife, a first fork, a second fork, and a spoon each of said utensils possessing an elongated handle defining generally oppositely facing first and second surfaces and an axis of elongation supporting a contoured gripping section said gripping section incorporating a plurality of contoured lands and at least three grooves separated by said lands where at least two of the at least three grooves are disposed on said first surface at an oblique angle relative to the axis of elongation of said handle and one of said at least three grooves being disposed on said second oppositely disposed surface, one of the at least three of said grooves of a select depth and shape to accommodate proper positioning of a user's thumb, a second of the at least three grooves of a select depth and shape to accommodate proper positioning of the user's index finger and a third of the at least three grooves of a select depth and shape to accommodate proper positioning of the user's middle finger;

placing a user's middle finger in the middle finger receiving groove of a select one of said utensils;

placing a user's thumb in the thumb receiving groove of said select one of said utensils; and placing a user's index finger corresponding to the index finger receiving groove of said select one of said utensils;

where the user is trained to hold said set of utensils in a manner corresponding to proper utensil etiquette.

4. The method of utensil training according to claim 3 where the utensils include a food contacting portion which is a unitary structure with the handle.

5. The utensil training method according to claim 3 where the handle includes a hand contact zone to enhance comfort of the hand when the hand and fingers are properly positioned.

6. The training method according to claim 3 further comprising the step of permanently forming the contoured gripping section on said shaft section.

7. The utensil training method according to claim 3 further comprising the step of forming the contoured gripping section and fitting said gripping section over said shaft section.

8. The utensil training method according to claim 3 further comprising the step of forming the gripping section from a polymeric resin.

9. The utensil training method according to claim 8 where the gripping section and the elongated shaft are of one-piece construction.

10. The utensil training method according to claim 3 where the gripping section is a sleeve composed of a resilient rubbery material.

11. The utensil training method according to claim 3 further comprising the step of color coding the respective grooves to assist in identification of proper finger position.

12. The utensil training method according to claim 11 where said coding comprises different colors to facilitate visual identification where each of said different colors corresponds to a finger or the thumb.

* * * * *